UNITED STATES PATENT OFFICE.

WILLIAM KEMMIS-BETTY AND BARRY SEARLE, OF NEAR JOHANNESBURG, SOUTH AFRICAN REPUBLIC.

PROCESS OF RECOVERING GOLD FROM PULP, SLIMES, OR SIMILAR SUBSTANCES.

SPECIFICATION forming part of Letters Patent No. 630,982, dated August 15, 1899.

Application filed December 15, 1898. Serial No. 699,383. (No specimens.)

*To all whom it may concern:*

Be it known that we, WILLIAM KEMMIS-BETTY, a subject of the Queen of Great Britain, and BARRY SEARLE, a citizen of the United States, both residing at the Crown Deep Mine, Limited, near Johannesburg, in the South African Republic, have invented certain new and useful Improvements in Processes for the Recovery of Gold from Pulp, Slimes, or Similar Substances Containing Same, of which the following is a specification.

Our invention relates generally to the recovery of precious metals from weak solutions of cyanid of potassium containing the same, and more specifically has for its object the recovery of gold from pulp, slimes, and similar products of ores.

Heretofore it has been common to dissolve the gold by solutions of cyanid of potassium and then to precipitate the gold therefrom, but so far as we know it has heretofore been impossible to successfully precipitate the gold by zinc from very weak solutions of cyanid of potassium. By our improved process we have overcome this difficulty and are enabled to use successfully cyanid-of-potassium solutions containing only from .005 per cent. to .025 per cent. of the cyanid of potassium and at the same time obtain almost complete precipitation of the gold contents.

The preferred method of carrying out our invention is as follows: We take freshly-cut zinc shavings and dip them into a solution of chlorid or other salt of lead. The solution of the lead salt should contain from one to two per cent. of such salt by weight. After the zinc is completely coated with lead (this result being indicated by the zinc shavings turning black) we remove the zinc shavings from the lead solution and wash them with fresh water to remove all traces of free acid. Then we place them in any ordinary box or tank suitably constructed to bring the gold-bearing solution into intimate contact with the coated zinc when said solution is passed through said box or tank. The gold-bearing ore having been reduced to a pulp, slime, or other finely-divided state it is treated with a weak solution of cyanid of potassium, which may contain only from .005 per cent. to .025 per cent. of such cyanid of potassium by weight. This solution after having dissolved the gold is caused to flow into and through the box containing zinc shavings prepared as above. At the beginning of such flow a second stronger solution of cyanid of potassium containing from two to four per cent. of such cyanid of potassium by weight is added to the gold solution at the intake of the precipitation box or tank in the proportions of about one-third to one-half of a pound of such second cyanid solution to each ton of gold solution passing through the precipitation-box. The addition of this stronger solution of cyanid of potassium should be continued for the first forty-eight hours at least. After that it may be reduced or in some cases dispensed with altogether.

By the above method of treatment we have successfully precipitated as high as 94.4 per cent. of the total gold contained in a solution of .005 per cent. of cyanid of potassium carrying only thirty-six grains of gold to the ton of solution.

The use of zinc shavings treated with the solution of a salt of lead as above is alone ineffective in producing a precipitation of the gold from such a weak cyanid-of-potassium solution and the addition of the second stronger cyanid-of-potassium solution (at anything near the above-mentioned proportions) at the head of a precipitation box or tank containing anything else than the lead-coated zinc shavings is also ineffective, the addition of such second cyanid solution simply having the effect to raise the strength of the entire solution from about .005 per cent. to about .006 per cent. of cyanid of potassium and having no action whatever in producing the desired precipitation of the gold. It is only when the process embodying both steps—to wit, the partial strengthening of the cyanid solution and the subsequent filtering through the lead-coated zinc shavings—is followed that successful results are obtained.

We are not at present prepared to state positively the theory of the operation of our improved process; but we are inclined to believe that the lead-coated zinc shavings form lead and zinc couples which in the presence of the added stronger solution of cyanid of potassium set up a mild galvanic action which precipitates the gold contained in the original solution.

The advantages of this invention are evident in that it gives a higher extraction and consequent saving of gold at a lower working cost than any at present in use, while the expense of the original installation is also low.

Of course various changes might be made in the processes above described, such as varying the proportions within limits, and the method of mixing the constituent substances without departing from the spirit and scope of our invention.

Having therefore described our invention, what we claim as new, and desire to protect by Letters Patent, is—

1. The process of precipitating gold from weak solutions of cyanid of potassium, which consists of the following steps; first, adding a second stronger solution of cyanid of potassium to the gold-bearing solution in about the proportions specified; second, filtering the resultant solution through a body of zinc shavings coated with lead, substantially as described.

2. The process of precipitating gold from weak solutions of cyanid of potassium, which consists of the following steps; first, dipping zinc shavings in a solution of a salt of lead; second, adding a stronger solution of cyanid of potassium to the gold-bearing solution; third, filtering the resultant solution through the body of zinc shavings so prepared, substantially as described.

3. The process of extracting gold from ores, which consists of the following steps; first dissolving the gold in the pulp in a weak solution of cyanid of potassium; second, adding a stronger solution of cyanid of potassium to the gold-bearing solution in the proportions specified; third, immediately after so strengthening the solution passing the same through a body of zinc shavings coated with lead, substantially as described.

Signed by us, at Johannesburg, South African Republic, this 14th day of November, 1898.

WILLIAM KEMMIS-BETTY.
BARRY SEARLE.

Witnesses:
HERM. PREUSSNE,
W. LAURANCE.